(No Model.) 2 Sheets—Sheet 2.
J. F. WEDDENDORF.
MOTOR.
No. 436,930. Patented Sept. 23, 1890.
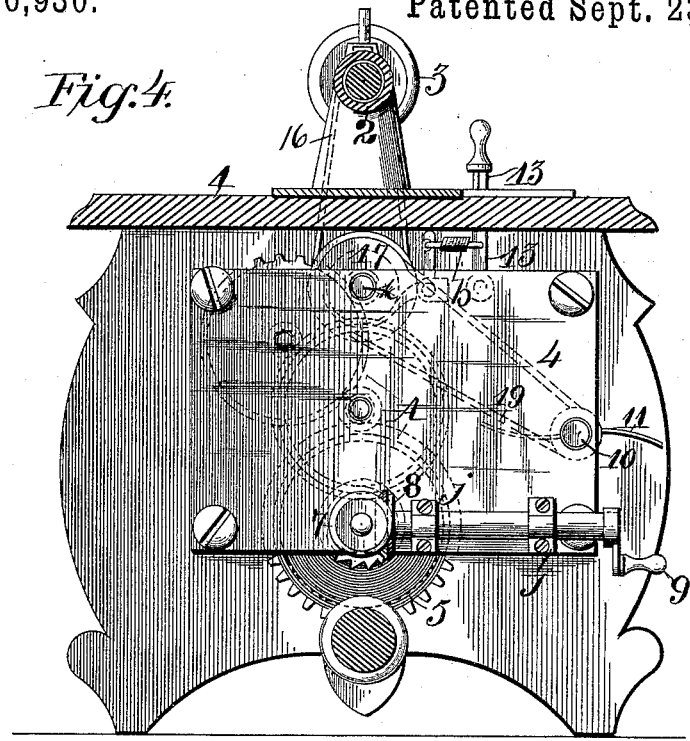
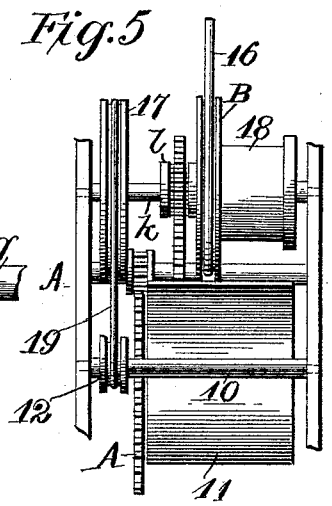
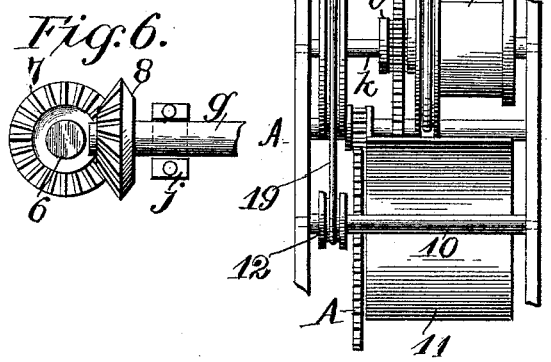
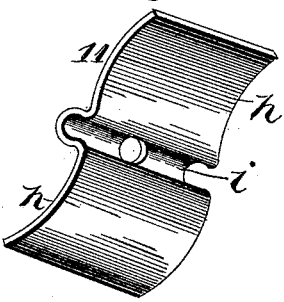
Witnesses
Inventor
John F. Weddendorf.
By his Attorneys
Higdon & Higdon

UNITED STATES PATENT OFFICE.

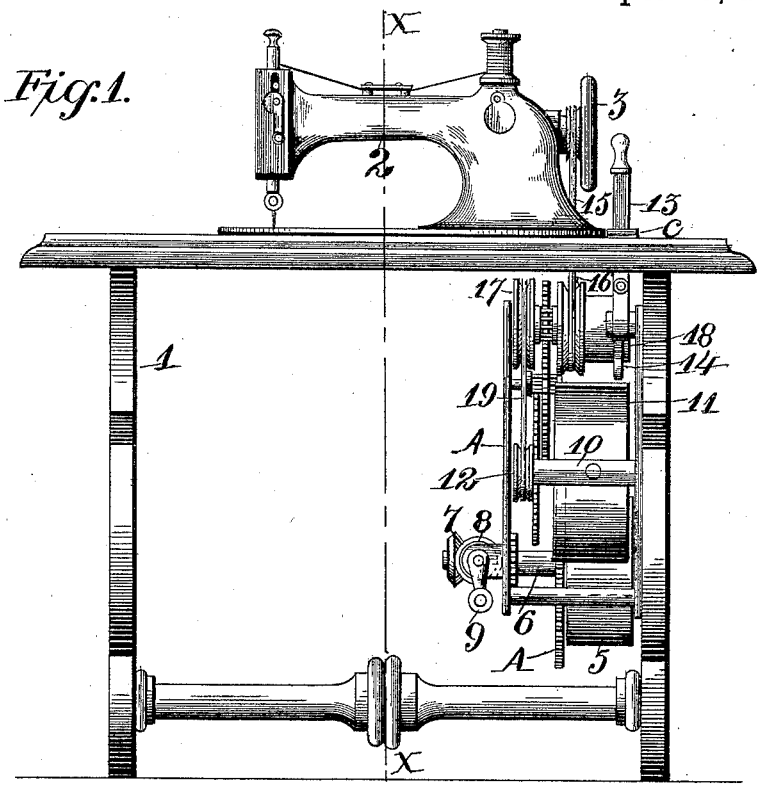

JOHN F. WEDDENDORF, OF ST. LOUIS, MISSOURI, ASSIGNOR OF ONE-HALF TO ANDREW MUELLER, OF SAME PLACE.

MOTOR.

SPECIFICATION forming part of Letters Patent No. 436,930, dated September 23, 1890.

Application filed May 3, 1890. Serial No. 350,443. (No model.)

*To all whom it may concern:*

Be it known that I, JOHN F. WEDDENDORF, a citizen of the United States, residing at St. Louis, in the State of Missouri, have invented certain new and useful Improvements in Motors, of which the following is a full, clear, and exact description, reference being had to the accompanying drawings, forming a part thereof.

My invention relates to certain new and useful improvements in motors; and it consists in the novel combination and arrangement of a brake therefor, all of which will be hereinafter fully described, and pointed out in the claim.

In the drawings, Figure 1 is a front elevation of my device as applied to a sewing-machine. Fig. 2 is a side elevation of the friction-brake and its attachments in position, the remaining parts being in cross-section. Fig. 3 is a top plan view of the toothed plate made use of in connection with the brake-lever. Fig. 4 is a vertical cross-sectional view taken on the line $x$ $x$ of Fig. 1. Fig. 5 is a side elevation of the pulleys and governing-van as applied to the motor. Fig. 6 is a detail view of the bevel-gears used in connection with the power-shaft, and Fig. 7 is a perspective view of the governing-fan.

Referring to the drawings, 1 is a stand having an ordinary sewing-machine mounted thereon.

A represents a motor or clock-work casing suitably secured to one side of the stand 1, within which is mounted a train of clock-work for imparting motion.

5 is a helical spring fastened to and mounted upon a shaft 6, from which power is established and imparted to the train of clock-work. To the projecting end of the shaft 6 is keyed a bevel gear-wheel 7, which meshes with a second bevel gear-wheel 8, keyed to a horizontal shaft $g$, which shaft is journaled in bearings $j$, fastened to casing for the clock-work A. To the projecting end of the shaft $g$ is fastened a crank 9, in easy reach of the operator, and which when turned operates the bevel-gears 7 and 8, which in their turn operate to wind the helical spring 5, which spring supplies the power to the clock-work.

10 represents a shaft journaled in the casing of the motor A, to which shaft is attached a governing-fan 11, for governing the said motor and supplying air to the operator on the sewing-machine. A shaft $k$ is journaled in the upper part of the motor or clock-work casing A, upon which is mounted a small pinion 1, meshing with the clock-work and is revolved thereby. To the shaft $k$ is also keyed a pulley 17, over which a band 19 passes to and over a small pulley 12, attached to the shaft 10, by which means the governing-fan 11 is revolved during the operation of the motor. The governing-fan is constructed of one piece of metal, and has its center formed of a semicircular shape to conform to the shape of the shaft 10, and is attached thereto at that portion. Leading from the semicircular portion $i$ of the governor 11 are two wings $h$ $h$, projecting in a reverse direction to one another and sufficiently curved as adapted for the purpose designed.

B is a large pulley attached to the shaft $k$, over which a band 16 passes, said band passing over the ordinary pulley or drum 3 of the sewing-machine 2, and imparts motion thereto through the medium of the motor.

To the casing of the motor is attached a bearing $d$, within which is a friction-lever 14, mounted for varying and controlling the speed of the motor. The friction-lever 14 consists of two arms $m$ and $f$ at right angles to one another, the lower one $m$ of which is of such curvature as to conform with the surface of the drum 18 of the motor. To the frame of the motor is also attached a hand-lever 13, which lever is connected to the upright arm $f$ of the friction-lever 14 by means of a coil-spring $b$, forming a connection therewith, which when the lever 13 is drawn, causes the curved arm $m$ to come in contact with the drum 18, thereby varying the speed of the motor at the will of the operator. The hand-lever 13 passes through a slot $n$ in the stand 1 and projects a sufficient distance above the same and in easy and convenient reach of the operator. The upper end of the lever 13 is of triangular shape, as shown at $a$, which comes in contact with a toothed plate $c$, fastened to the top of the stand immediately above the slot $n$, and which, in connection with one another operates to hold the lever at any desired angle, varying the speed of the motor, as desired. It will be further seen that the speed can be varied very successfully by the lever, decreasing, increasing, or entirely stopping the motor in an instant. The regulating-lever, as will be seen, projects above the upper surface of the stand, by which means it is very desirable and convenient to the operator.

Having fully described my invention, what I claim is—

The combination, with a train of clock-work, of a drum mounted on a shaft of the said train, a pivoted angled lever having one of its arms curved and embracing the said drum, a pivoted hand-lever, and a spring connecting the said hand-lever with the straight arm of the angled lever, as described.

In testimony whereof I affix my signature in presence of two witnesses.

JNO. F. WEDDENDORF.

Witnesses:
C. F. KELLER,
JNO. C. HIGDON.